(No Model.)
M. R. JEWELL.
T-SQUARE RULE.
No. 518,759. Patented Apr. 24, 1894.
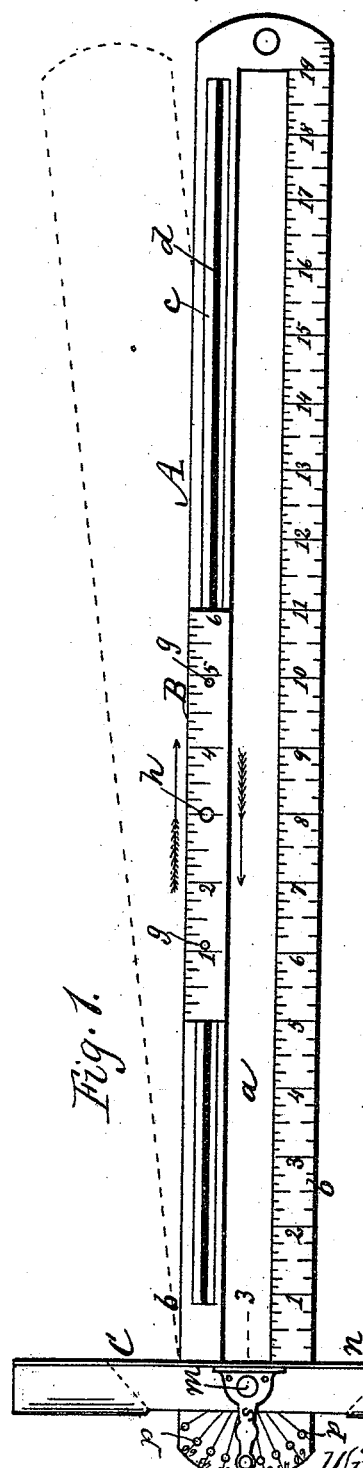
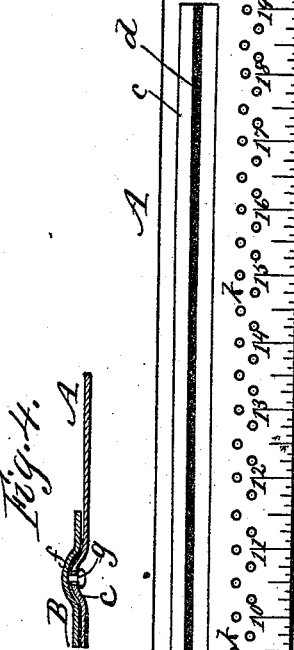
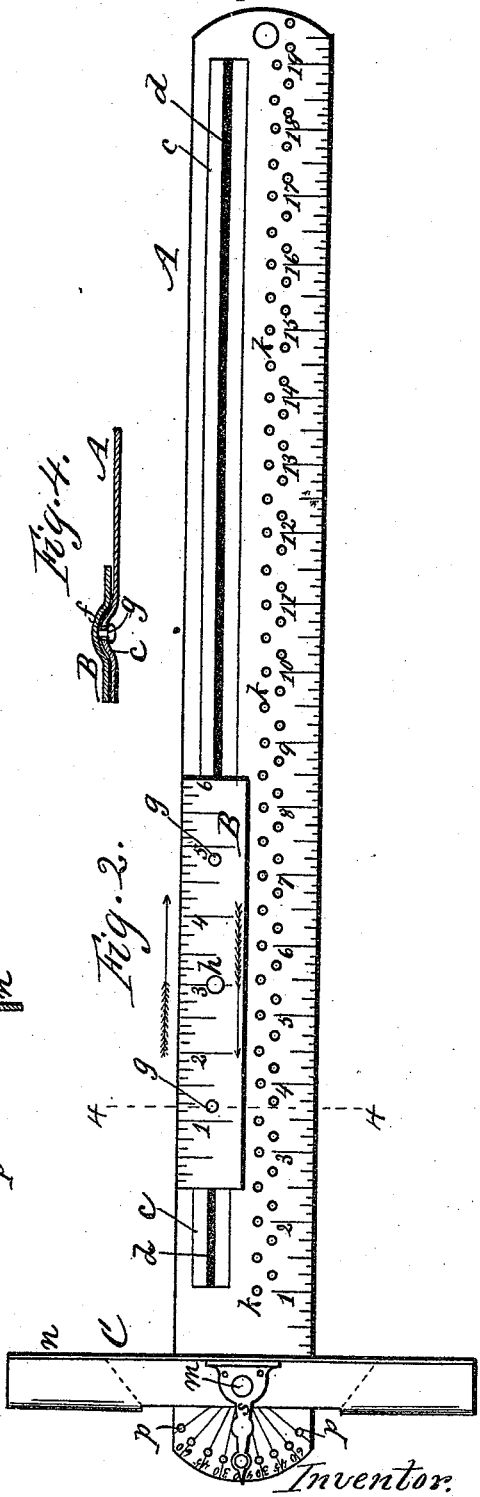
Witnesses.
R. F. Osgood
C. R. Osgood
Inventor.
Major Romeyn Jewell
THE NATIONAL LITHOGRAPHING COMPANY,
WASHINGTON, D. C.

UNITED STATES PATENT OFFICE.

MAJOR ROMEYN JEWELL, OF ROCHESTER, NEW YORK.

T-SQUARE RULE.

SPECIFICATION forming part of Letters Patent No. 518,759, dated April 24, 1894.

Application filed March 31, 1893. Serial No. 468,537. (No model.)

*To all whom it may concern:*

Be it known that I, MAJOR ROMEYN JEWELL, of Rochester, in the county of Monroe and State of New York, have invented a certain new and useful Improvement in Rulers; and I do hereby declare that the following is a full, clear, and exact description of the same, reference being had to the drawings accompanying this application.

My improvement relates to rulers made of thin metal or other suitable material and having a slide provided with a scale movable thereon in a longitudinal direction, whereby from any given point on the ruler a series of measurements can be laid out by the slide with great facility. It also relates to a ruler provided with a T head and with a series of holes through which a pencil point may be inserted, and, by the aid of the slide, parallel vertical lines can be marked at any given distance from the base line. The invention consists in the construction and arrangement hereinafter described and claimed.

In the drawings—Figure 1 is a plan view of the ruler provided with a central opening whereby a series of equi-distant parallel lines may be marked. Fig. 2 is a similar view of a solid ruler. Fig. 3 is a longitudinal section in line 3—3 of Fig. 1. Fig. 4 is an enlarged cross section in line 4—4 of Fig. 2.

A indicates the ruler, which is made of thin metal, rubber, wood, or other suitable material; and provided on one or both edges with an ordinary scale. As shown in Fig. 1 it has a central opening $a$, which is of slightly greater width than the sides $b\ b$, by which means a series of equidistant parallel lines may be drawn along the edges. In Fig. 2 it is shown of solid form.

B is a slide on one face of the ruler, arranged to move forward or back in either direction, as indicated by the arrows, said slide provided with a scale of inches and subdivisions of its own, as shown. The body of the ruler on the side where the slide rests is struck up to form a convex seat $c$, and this seat is centrally slotted as shown at $d$. The slide is similarly struck up as shown at $f$, fitting the seat, and is provided with a rivet or rivets $g$, which passes through the slot and is headed on the under side to prevent the rivet from being drawn through the seat. The head of the rivet rides in the concave of the seat without coming in contact with the surface over which the ruler rests. The slide has a small thumb screw $h$ projecting upward, by which the slide is moved and also secured at any point desired. By this arrangement the slide can be moved forward or backward to any desired point on the ruler, and a series of measurements can be laid out by it from that point independent of any measurement on the ruler itself. This point of starting may be intermediate of the divisions of the scale on the ruler, and it enables the operator to lay out quickly a series of parallel lines, or other measurements, which would take much time to lay out by measurement from the ruler itself. For instance, suppose it is desired to lay out a series of inches starting from a point three and one-fourth in inches on the ruler; it can be readily done by moving the slide to the three and one-fourth inch starting point and marking the inch points from the slide; whereas, to get the same series of measurements from the ruler itself would require extra computation and manipulation.

By the construction above described the slide is adapted to the thin ruler, the seat forming a guide to the slide and the slot keeping it in place, while the head of the rivet rides above the surface on which the ruler rests. The ruler is also provided with two or more sets of holes $k\ k$ as shown in Fig. 2, which holes alternate or break joints, said holes of each set being located at a given distance apart say one-fourth of an inch more or less. A pencil point is placed in the holes, then by sliding the ruler up or down by the use of a T head, series of vertical lines can be drawn at right angles to the parallel lines drawn along the edge of the ruler. By the use of the slide, as before described, such points for locating the parallel lines can be started from the slide set at any place on the ruler, saving the necessity of measuring on the ruler itself, and thereby greatly facilitating the operation.

C is a T-head to the ruler. It is made by folding a strip of thin metal double, with sufficient space between the faces for the free passage of the end of the ruler between them, which end projects through and beyond the head as shown, and is secured by a rivet or screw bolt *m* which allows the ruler to turn thereon. The flanges *n n* of the head are turned up and down as shown, and serve as the bearing against the edge of the board over which the ruler is used. The slotted part of the head in which the end of the ruler rests extends such a distance beyond the edges of the ruler as will allow the ruler to turn in either direction to make angular lines, but the space between the ends of the head are filled by solid blocks riveted in place, the inner ends of said blocks being indicated by the dotted lines in Figs. 1 and 2. The end of the ruler which projects beyond the head is provided with a radial scale marked in degrees as shown, the degree marks being located in line with a series of holes *p p*. Through these holes passes a pin *p′*, attached to a spring *s*, riveted or otherwise secured to the head and provided with a finger piece *t* by which it is operated.

By the means above described the ruler can be changed to any angle relatively to the head. To do so it is only necessary to raise the spring *s* so as to release its pin from the hole in which it rests, then turn the ruler to the requisite angle as indicated by the degree line thereon, when the pin will strike into the corresponding hole and hold the ruler in place at the new adjustment. The spring has a pointer on the outer end to register with the numbers on the degree lines. The pin is slightly tapered, so that from the pressure of the spring it always fits snugly the hole into which it is inserted and avoids any play or loose movement of the ruler from the angle desired.

Having described my invention, what I claim as new, and desire to secure by Letters Patent, is—

1. A ruler consisting of a body or plate and a slide movable forward and back thereon, the ruler being struck up and slotted to form a seat for the slide, and the slide provided with a rivet or rivets that rests in the slot of the seat, as and for the purpose specified.

2. A ruler consisting of a body or plate and a T-head to which the ruler is pivoted, the T-head consisting of a strip folded double and slotted for the passage of one end of the ruler, one or both the flanges being bent at right angles to form a riding edge, as herein shown and described.

3. The combination of the T-head, consisting of a strip folded double and slotted for the passage of the end of the ruler, the ruler projecting through the head, pivoted thereto, and provided with holes in the projecting end registering with degree lines, and the spring attached to the head and provided with a pin entering the holes, as shown and described and for the purpose specified.

4. The combination of a ruler provided with two or more sets of holes alternating with each other and arranged in line with graduations on the scale, a T-head attached to one end of the ruler, and a graduated slide attached to the ruler and fitted to move over a convex seat of the same, as shown and described and for the purpose specified.

In witness whereof I have hereunto signed my name in the presence of two subscribing witnesses.

MAJOR ROMEYN JEWELL.

Witnesses:
R. F. OSGOOD,
C. R. OSGOOD.